US005479154A

United States Patent [19]

Wolfram

[11] Patent Number: 5,479,154

[45] Date of Patent: Dec. 26, 1995

[54] PROCESS FOR OPERATING A REMOTE-CONTROLLABLE CENTRAL LOCKING INSTALLATION OF A VEHICLE

[75] Inventor: Berthold Wolfram, Regensburg, Germany

[73] Assignee: Siemens Aktiengesellschaft, Munich, Germany

[21] Appl. No.: 937,852

[22] PCT Filed: Apr. 5, 1991

[86] PCT No.: PCT/EP91/00653

§ 371 Date: Oct. 6, 1992

§ 102(e) Date: Oct. 6, 1992

[87] PCT Pub. No.: WO91/15645

PCT Pub. Date: Oct. 17, 1991

[30] Foreign Application Priority Data

Apr. 6, 1990 [EP] European Pat. Off. .............. 90106581

[51] Int. Cl.[6] .............. G06F 7/04

[52] U.S. Cl. .............. 340/825.31; 340/825.72; 377/15

[58] Field of Search .............. 340/825.31, 825.69, 340/825.72, 825.32; 377/9, 15; 307/10.1, 10.2, 10.3, 10.4, 10.5, 10.6, 115, 125

[56] References Cited

U.S. PATENT DOCUMENTS

| | | | |
|---|---|---|---|
| 4,453,161 | 6/1984 | Lemelson | 340/825.31 |
| 4,509,093 | 4/1985 | Stellberger . | |
| 4,837,567 | 6/1989 | Kloefeldt et al. | 340/825.31 |
| 5,365,225 | 11/1994 | Bachhuber | 340/825.72 |

FOREIGN PATENT DOCUMENTS

| | | |
|---|---|---|
| 0292217 | 11/1988 | European Pat. Off. . |
| 0395596 | 10/1990 | European Pat. Off. . |
| 2580128 | 10/1986 | France . |
| 3225754 | 1/1984 | Germany . |
| 3611147 | 10/1986 | Germany . |

OTHER PUBLICATIONS

"Einer Für Alle", Von Götz Weihmann, (dated 1987).

*Primary Examiner*—Donald J. Yusko
*Assistant Examiner*—Gregg V. Miller
*Attorney, Agent, or Firm*—Hill, Steadman & Simpson

[57] ABSTRACT

A process for operating a remote-controllable central locking installation of a vehicle by means of a transmitter, which can transmit coded signals—for example acoustically by means of ultrasound, optically by means of IR and/or by means of USW high-frequency waves—to a receiver fitted in or on the vehicle. An initialization is typically carried out before the actuation for the first time of the central locking installation, or a reinitialization is carried out before the next actuation of the same, to cancel the previous code, that is the code which can be used in future, or in the case of a changing code the relevant code set which can be used in future, being fixed for the first time or once again by the receiver being driven, for example by means of a special control code, into a state in which it can be (re)initialized. The receiver indicates that the receiver is ready for (re)initialization and/or after successful (re)initialization by means of an activation of the door locks.

13 Claims, 4 Drawing Sheets

PROCESS FOR OPERATING A REMOTE-CONTROLLABLE CENTRAL LOCKING INSTALLATION OF A VEHICLE

BACKGROUND OF THE INVENTION

The invention relates to an improvement of the specific process for operating the receiver of a remote-controllable central locking installation during the initialization or reinitialization of the transmitter-receiver system. The invention is thus to be applied during the course of the (re)finding or (re)establishing of the code which can be used in the future for actuating the locking installation.

In this respect, the invention is based on that process for operating a remote-controllable central locking installation of a vehicle by means of a transmitter, which can transmit coded signals—for example acoustically by means of ultrasound, optically by means of IR and/or by means of USW high-frequency waves—to a receiver fitted in or on the vehicle. An initialization is carried out before the actuation for the first time of the central locking installation, or a reinitialization is carried out before the next actuation of the same, to cancel the previous code, that is the code which can be used in the future, or in the case of a changing code the relevant code set which can be used in the future, being fixed for the first time or once again, by the receiver being driven, for example by means of a special control code, into a state in which it can be re-initialized. An indication controlled by the receiver, for example an optical indication, is directed to the reinitialization person during the re-initialization. This configuration is known from— FR-A-2 580 128. In the case of this prior art, a special luminescence diode, controlled by the receiver, is provided as an indicating element, in order to indicate to the (re)initializing person during the course of clock-synchronized operator prompting when this person can in each case transmit to the receiver (again) an individual pulse of the code formed from a lengthy series of individual pulses.

However, the invention does not necessarily serve for clock-synchronized operator prompting of the (re)initializing person, but for the purpose of supporting this person—independently of any additional clock-synchronized individual pulse entry—generally in (re)initialization. The invention is thus suitable also for a central locking installation in which this person would need no clock-synchronized operator prompting at all for (re)initialization. The invention also requires no indicating element fitted specifically for the central locking installation concerned as an additional item of equipment for supporting (re)initialization.

There are further central locking installations with indicators fitted specifically for them. For example EP-A2-395 596, describes a transmitter having fitted LED indicators, which indicate during the normal operation procedure of the central locking installation to the person using it that his motor vehicle is properly locked and the alarm system has been switched on. There it is also described, inter alia, that the alarm system concerned can switch on an additional LED indicator in the passenger compartment, as well as, in the case of alarm, switch on for example also the horn or the front headlamps and possibly switch off the ignition or gas pump.

However, the invention does not relate to this type of combination of a central locking installation with an alarm system, although the invention allows such a combination in principle. The invention also does not require an indicating element which is fitted specifically for the central locking installation concerned as an additional item of equipment to support the operation of the transmitter or of the receiver.

In the case of alarm systems, it has been usual for some time to utilize the horn and the front headlamps such as to utilize indicators which are very noticeable from great distances and are available in the motor vehicle in any case for other reasons, in order to indicate a case of alarm.

Very different processes for the (re)initialization of remote-controlled central locking installations are also known per se, these processes in particular being technically particularly complicated in some cases, particularly if a so-called changing code is to be used, which can, as known, offer particularly great protection against unauthorized actuating of the locks, or even if a changing code with dialog operation between the transmitter and the receiver is to be used. Reference is made in this respect just by way of example to - DE-A1- 32 25 754.

The invention is not restricted to a particular code, nor to a particular changing code. The invention namely allows the use of any codes.

It is also known that, in the motor vehicle sector specifically, one of the prime objectives of virtually all developers has always been to save costs or to further reduce outlay, that is also to simplify as many components as possible or, where possible, omit them entirely, without impairing operational reliability or convenience, In view of these intensive efforts of developers, as known, it is no longer an everyday object which can be readily achieved with expert knowledge to accomplish further noticeable savings without impairing operational reliability and convenience.

SUMMARY OF THE INVENTION

Objects of the invention are:

to make particularly low the outlay on those components which serve to facilitate the (re)initialization of the central locking installation for the (re)initializing person, but nevertheless to provide this person with the certainty that he is correctly carrying out the (re)initialization. The objects are achieved wherein the receiver indicates at the end of a successful re-initialization by means of a visible and/or audible actuation of the central locking installation of the vehicle that the receiver has been re-initialized, and wherein the receiver can be driven into a state which it can be (re)initialized by means of a normally unusual actuation of the ignition key, for example by means of rapid switching on and off of the ignition ten times. Thus, with a particularly low outlay, the invention reduces the occurrence of that person not having adequate control and certainty whether his transmitter is being satisfactorily (re)initialized.

All the specific measures of the invention allow said object of the invention to be achieved, in particular to minimize as much as possible the additional outlay for supporting the person carrying out the (re)initialization. The measures according to the invention namely allow indication to this person in a simple way that the receiver of the central locking installation really was in fact ready for (re)initialization and has now been satisfactorily (re)initialized, and that the actuating of the central locking installation can be used also to indicate the readiness of the receiver to be fixed to a new code or to a new code set, and that the buttons normally available in any case in a central locking installation to be used also to indicate the accomplished (re)initialization of the receiver, and that the ignition available in any case in a vehicle or the ignition key in any case required to be used also to drive the receiver into its state of readiness to be (re)initialized.

DETAILED DESCRIPTION OF THE PREFERRED EMBODIMENTS

The invention thus relates to a process for operating a remote-controllable central locking installation of a vehicle. Serving for remote control is a transmitter, which can transmit coded signals—for example acoustically by means of ultrasound, optically by means of IR and/or by means of USW high-frequency waves—to a receiver fitted in or on the vehicle.

The code used for the normal actuation of the central locking installation must, however, first be fixed itself, irrespective of whether a so-called fixed code, that is subsequently always the same code, or a changing code, that is subsequently a code changing continually in accordance with a certain pattern, is to be used. This fixing is known as initializing or reinitializing. Before actuating the central locking installation for the first time, the receiver thus has to be initialized, generally so too at the same time does the transmitter concerned,—or, to effectively cancel the previous code or the previous code set, before the next actuation of the central locking installation the receiver has to be reinitialized and, when this is done, generally the transmitter also has to be reinitialized. Thus, by this (re)initialization, if a fixed code is used the code which can be used in the future is fixed, or if a changing code is used the relevant code set which can be used in the future is fixed.

A known remote controllable central locking installation is described in FR 2,580, 128 and is described in detail below.

Figure 1:
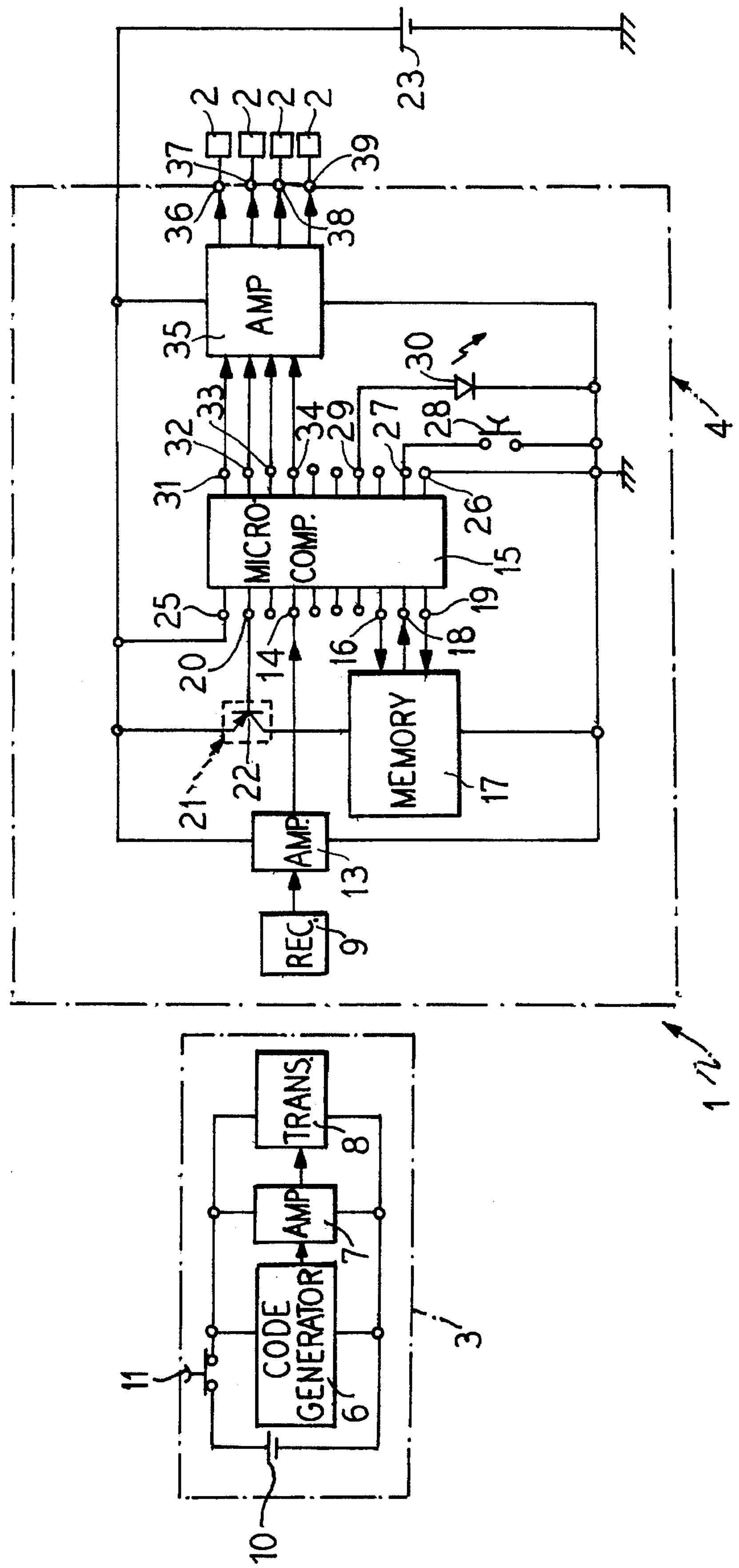
FIG. 1 (PRIOR ART)
FIG. 1 is an electrical schematic of a prior art remote controllable central locking installation.

With particular reference to FIG. 1, the number 1 has been assigned to indicate in its entirety a device for the control of actuating means 2 which are installed on a vehicle, the latter not being represented in the drawing. In particular, although not exclusively, the actuating means could be constituted, for example, by a mechanism for bolting the lock of a vehicle, by a switch for controlling a light bulb situated within the passenger space of the vehicle, by a connecting relay of an anti-theft system, etc.

The device 1 comprises, essentially, an independent emitter 3 which can be actuated by the user and a receiver 4 which is installed as an integral part of the abovementioned vehicle.

Said emitter 3 comprises, essentially, a coded-message generator 6, an amplifier 7 and a transmitting transducer 8 for the purpose of transmitting to a corresponding receiving transducer 9, installed in the receiver 4, the coded message which is sent out by the generator 6. The emitter 3 also comprises an electric-storage cell or battery 10, which is intended to supply electric power to the generator 6, the amplifier 7 and the transmitting transducer 8, all by means of one key 11.

Said transducers 8 and 9 can be constructed in any appropriate fashion. For example, they might constituted, respectively, to good advantage by transducers of such types as are photosensitive, electromagnetic, ultrasonic, etc.

Said receiver 4 comprises an amplifier 13, the inlet of which is connected to the receiving transducer 9 and an outlet of which is connected to an inlet 14 of a microcomputer 15. This last-mentioned unit possesses an outlet 16 connected to a corresponding inlet of a memory 17, which latter is intended to record and read data electrically, but without losing these data in the event of an electric power failure. These memories are commercially known, for example, by the acronym $E^2$ PROM. Said memory 17 presents a signal output connected to an inlet 18 of the microcomputer 15, which in turn presents two other outlets 19 and 20, respectively, which are connected to an inlet serving to mobilize the operation of the memory 17 and to a guidance terminal of an electronic switch 21 which is adapted so as to interrupt the electric power supply to the memory 17. In the particular case being considered here, said electronic switch 21 is constituted by a transistor 22 of the PNP type, the base of which is connected to the outlet 20 of the microcomputer 15, the collector of which latter is connected to a positive power-supply intake of the memory 17 and the emitter of which is connected to a positive pole of an electric-storage cell or battery 23, for example, a power supply connected to the battery unit of the vehicle.

The microcomputer also presents electric-power intakes 25 and 26 which are connected, respectively, to the positive pole of the battery 23 and to the ground, to which the negative pole of the battery 23 is likewise connected. Furthermore, an inlet 27 of the microcomputer 15 is connected to the ground through a key 28 of the type that is normally open. An outlet 29 of the microcomputer 15 is connected to the ground by way of a light-emitting diode 30, and several outlets 31, 32, 33, 34 of said microcomputer 15 are connected, respectively, to corresponding inlets of an amplifier 35, which latter possesses several outlets 36, 37, 38, into each of which one of the actuating means 2 leads.

The operation of the device I is programmed, insofar as the receiver 4 is concerned, by the microcomputer 15, in accordance with cycles of a known type and with the aid of appropriate combinations of those signals which are present at outlets 31, 32, 33, 34 for the purpose of mobilizing, through the instrumentality of the amplifier 35, that of the actuating means 2, which has been selected beforehand. The operation of the device 1 will now be explained in a general way; and afterwards, a detailed disclosure will be given with particular reference being made to FIGS. 2 and 3.

It will be assumed, first of all, that the coded message which each emitter 3 sends to the receiver 4 is constituted, for example, by a logic-type signal consisting essentially of a sequence of bits (for example, 16 bits), each of which bits may without distinction take the logic level of "1" or of "0". As will be seen hereinunder, it is advantageous that the transmitted sequence of the signals at logic levels "1" or "0", which sequence constitutes altogether the coded message generated by a particular emitter, also be transcribed on a paper medium which the user will preserve in order to be able to invoke on the receiver 4 in the event of his having misguided the emitter 3.

In the course of execution, the constructor of the device 1 commits into the memory 17 of each receiver 4 a unique coded message which, for the sake of convenience, will be called a universal code. By acting in this manner, it is possible to verify the correct operation of each receiver 4 with the use of a unique emitter 3 in which the generator 6 evidently sends out this universal code. The constructor of the device 1 also takes measures beforehand to construct the emitters 3 in such a way that each of them will already be so programmed as to send out its own coded message.

The user is then provided with at least one emitter 3 and one receiver 4 which are to be installed on the vehicle. The maximum number of emitters will depend on the number of the coded messages that can be stored inside of the memory 17 of the receiver 4 in the manner described hereinunder.

The programming of a new coded message inside of this memory 17 takes place in three different ways, according to which:

1. The memory 17 has never been programmed by the user, so it still contains the universal code in its interior;
2. The memory 17 contains at least one message which has been coded or programmed by the user, who wishes to introduce another coded message into the memory;
3. The memory 17 contains one or more coded messages, the corresponding emitter 3 of which has been misguided by the user.

In the first case, the storage of the coded message in the memory 17 is accomplished by maintaining the key 28 of the receiver 4 in the pressed position and by also pressing the key 1 I of the emitter 3 in such a way as to transmit to the receiving transducer 9 the coded message which the transmitting transducer 8 receives from its generator 6. This operation involves the recording of the new coded message in the memory 17 and the erasing or inhibition of the abovementioned universal code, thereby combining unequivocally the emitter 3 and the receiver 4.

In the second case set forth above, the storage of successive coded messages in the memory 7 can be accomplished simply by keeping the key 28 pressed and by transmitting first of all one of the messages that has been coded and already stored in the memory 17. It is only in these conditions that the microcomputer 15 will agree to transfer into the memory 17 a new coded message being transmitted by a corresponding emitter.

In the third case, the memory 17 can likewise be mobilized to store a new coded message, even without transmitting by means of the emitter 3, which has been misguided, the coded message already present in the memory 17. This can be accomplished by pressing, in an appropriate manner, the key 28 as a function of predetermined optical signalings emitted by the light-emitting diode 30. For example, it would be possible to press the key 28 three times in succession during a predetermined period of time (for example, 3 seconds), and the microcomputer 15 would then send at its outlet 29 a signal that would alternately be at level "1" and at level "0", for example, with a frequency on the order of 0.5 Hz, in such a way as to maintain the light-emitting diode 30 illuminated during one second and extinguished during one second, respectively, and to do so a number of times that would be equal to the number of bits (16, in this example) making up the sequence of one of the coded messages in the memory 17. At each illumination of the diode 30, which corresponds to one respective bit of the coded message, the user would have to press the key 28 if this key is at logic level "1", or else not press it if this key is at logic level "0". If the sequence of the coded message is reproduced exactly by means of the key 28, the microcomputer 5 will comport itself in a manner analogous to that which has been described above apropos of the second case—that is to say, by permitting the storage of a new coded message being transcribed by a corresponding new emitter 3.

In each of the cases described above, the microcomputer 15 feeds the memory 17 by way of the electric switch 21 and mobilizes it for operation by means of a signal which is only present at its outlet during the length of time that is strictly necessary, so as to prevent this memory 17 from consuming power also during the period in which it should be neither transmitting nor receiving data, and so as not to cause thereby an undesirable and useless diminution of the charge of the battery 23.

Figure 2:
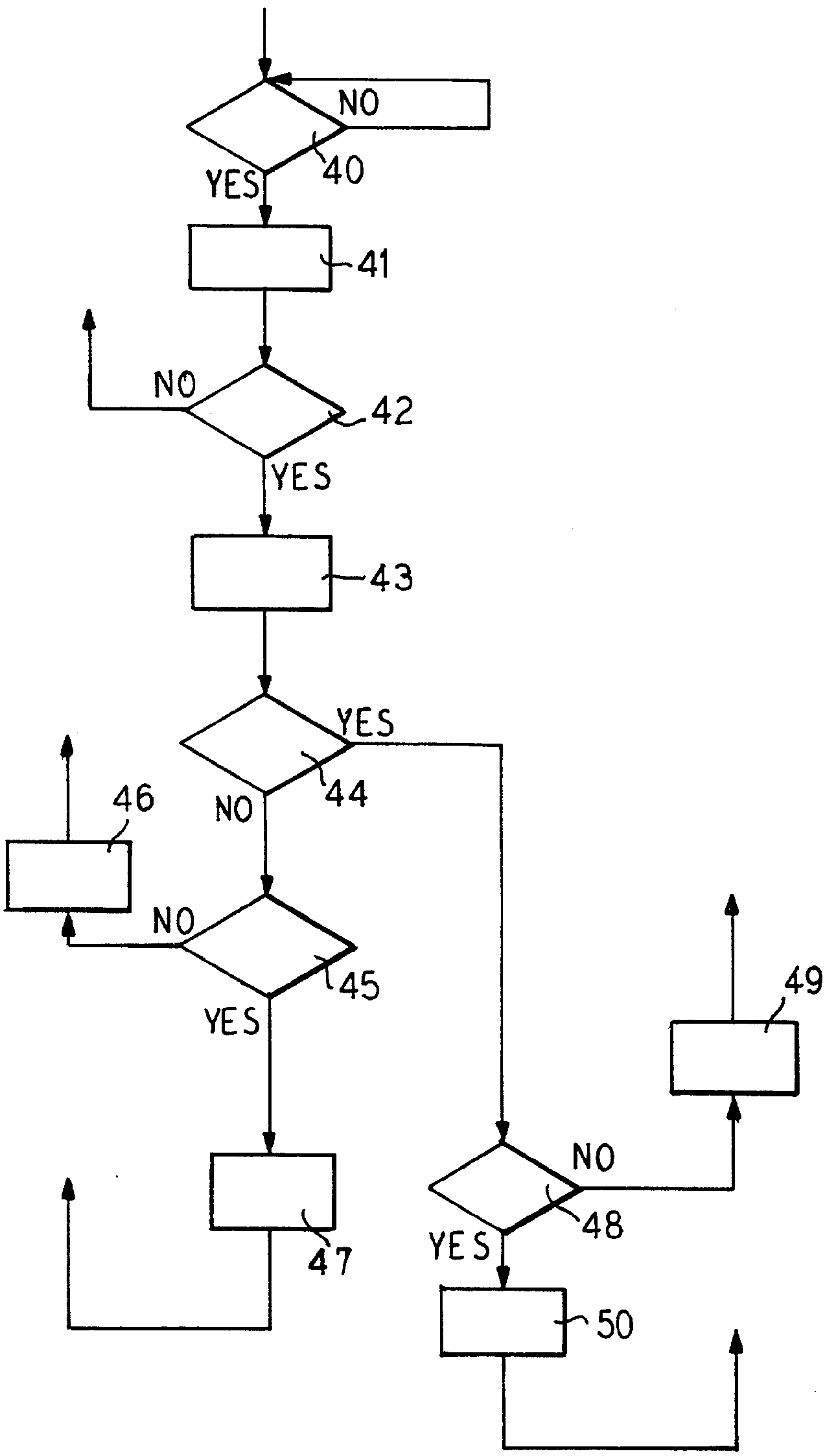
FIG. 2 (PRIOR ART)
FIG. 2 is a schematic flow diagram of the operation of the system of FIG. 1.

With reference being made to FIG. 2, a detailed description will now be given of the operating cycle of the receiver 4 when it is receiving either the abovementioned universal code or one of the messages which have been coded and stored in the memory 17. First of all, there is a block 40 which verifies whether, at the inlet 14 of the microcomputer 15, there exists a coded message which will henceforth be designated by the code symbol proceeding from the abovementioned receiving transducer 9. If the response is No, there will be a return to the inlet of said block 40; if, on the contrary, the response is Yes, the code will be transmitted to a second block 41, which will undertake to verify the syntactic correctness of the code received. From block 41, one arrives at the third block 42, which verifies whether the code received is syntactically correct or not so correct. If the response is negative, one returns to the point of departure; whereas, if the response affirmative, one arrives at a fourth block 43, which mobilizes the operation of the memory 17 by the sending of a signal to the outlet 19 of the microcomputer 15 and supplies power to the memory 17 by the sending of a signal to the terminal 20.

One then arrives at a fifth block 44, which verifies whether, in the memory 17, there exist codes that have been stored by the user. If the response is negative, this signifies that only the universal code is present, after which one arrives at another comparison block 45, which verifies whether the code present at the inlet 14 coincides with the universal code. If the response is in the negative, one arrives at a code 46 which inhibits the receiving and processing of any further code during a predetermined period, for example, of 10 seconds, after which it causes the cycle to recommence form the start. On the contrary, if the response is in the affirmative, the universal code is acknowledged, with the result that one arrives at block 47 which activates the signals at outlets 31, 32, 33, 34 of the microcomputer 15. In this way, it is thus possible to verify whether the receiver 4 is responding correctly to the order which has been given to it by the emitter 3.

In the event of there already existing a code that has been stored in the memory by the user, one arrives from block 44 to another comparison block 48 which, in this case, verifies whether the code present at the inlet 14 is one of those codes which are stored in the memory 17. If the response is in the negative, one arrives at a block 49 which is analogous to block 46 described above (inhibition of the receiver 4 during a predetermined period of time); but, if the response is in the affirmative, on the other hand, one arrives at block 50, which will activate outlets 31, 32, 33, 34 of the microcomputer 15. Consequently, the actuating means 2 are likewise actuated in such a way as to achieve, for example, the unbolting of the locks, or the illumination of the light inside of the passenger space, or els the mobilization of the anti-theft device, etc.

Figure 3:
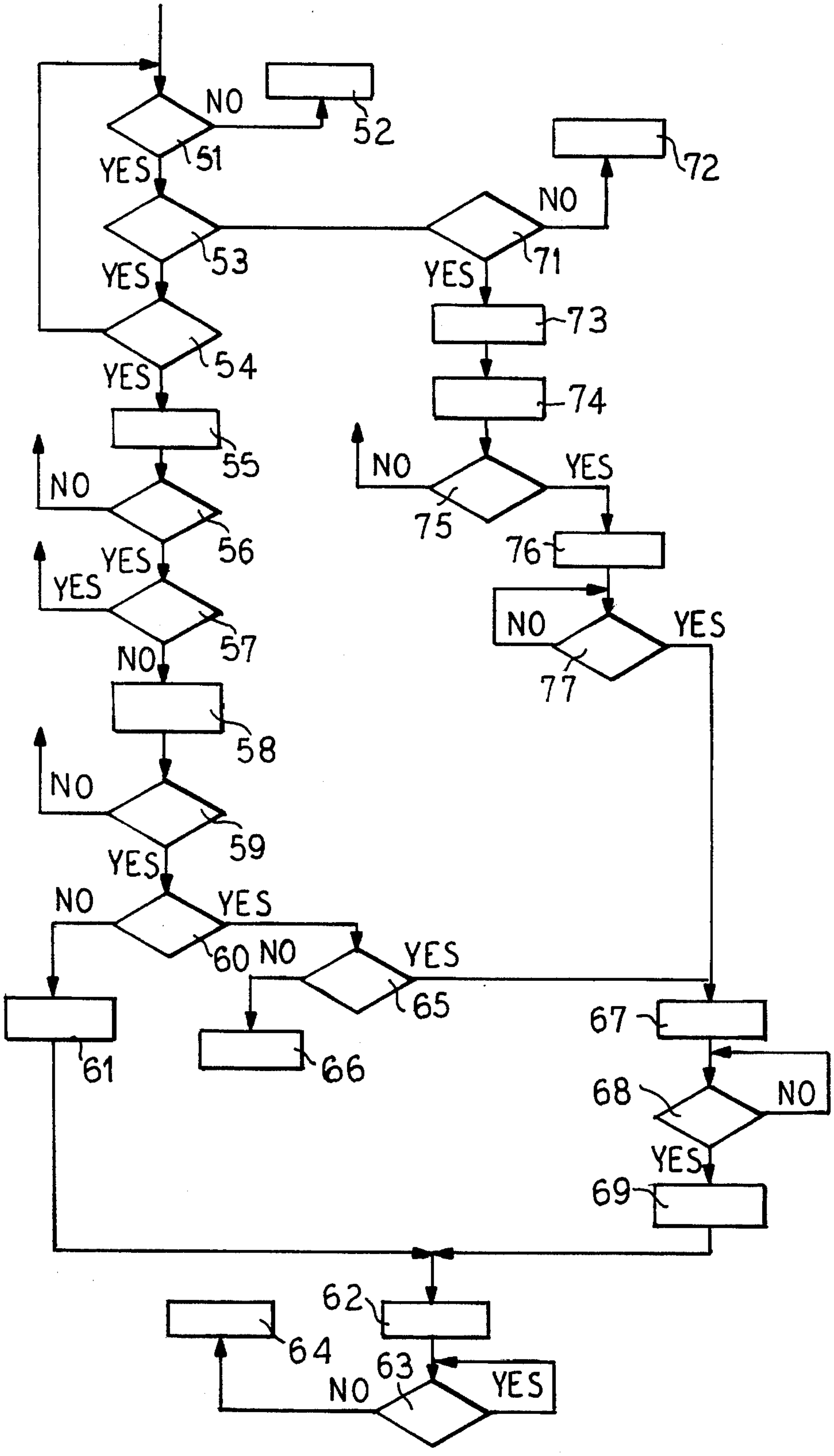
FIG. 3 (PRIOR ART)
FIG. 3 is a schematic flow diagram of a reprogramming operation of the system of FIG. 1.
Figure 4:
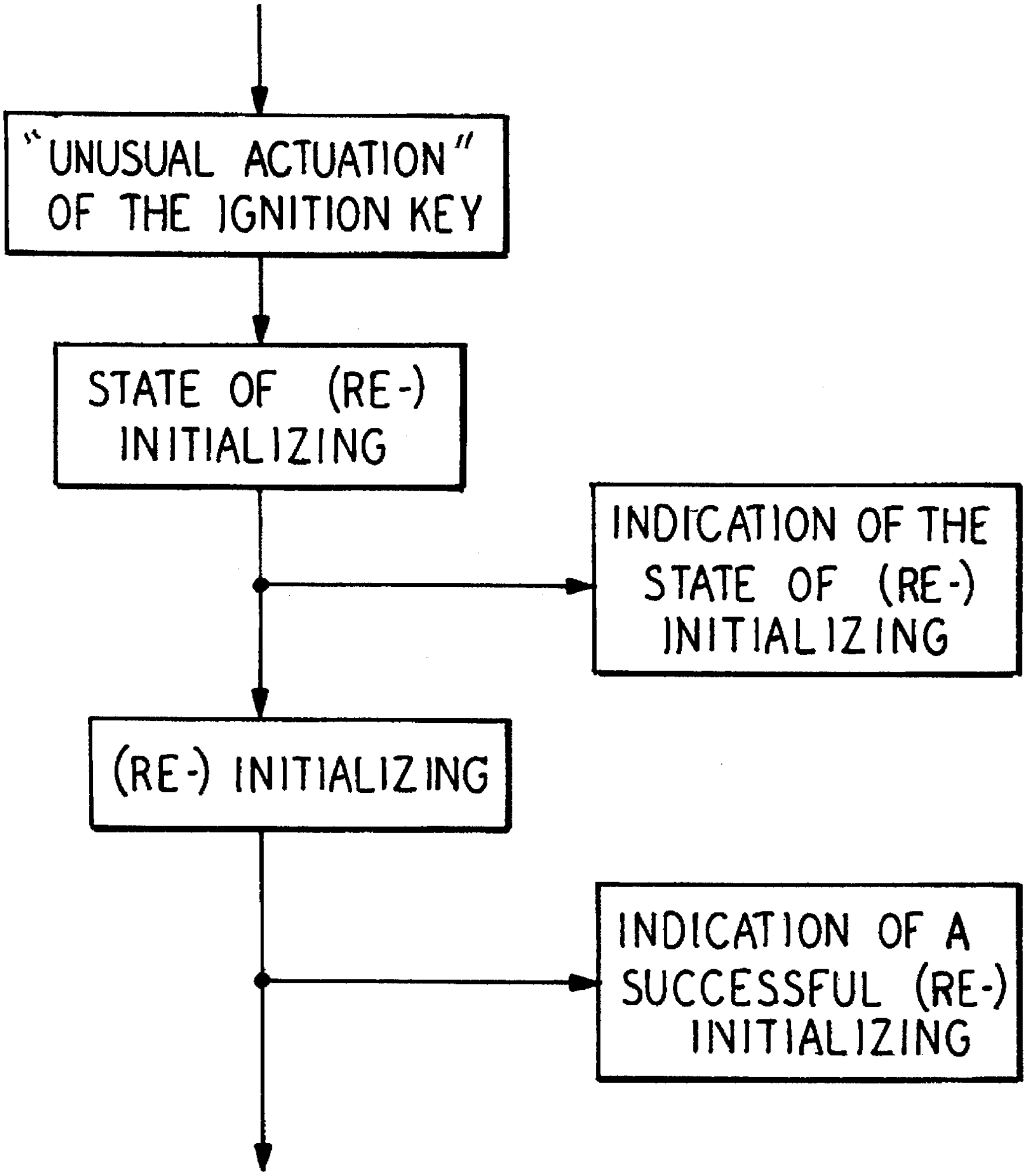
FIG. 4 is a schematic flow diagram of the steps of the present invention.

With reference to FIG. 3, a detailed description will now be given of the operating cycle of the receiver 4 insofar as the programming of new codes inside of the memory 17 is concerned.

First of all, one arrives at block 51 which verifies whether or not the key 28 is pressed. If the response is in the negative, the operating cycle is deviated towards a block 52 which represents the overall operating cycle of the receiver 4. If the response is in the affirmative, one arrives at another block 53, which is a comparison block and which verifies whether the key 28 is being pressed continuously or not. If the response is in the affirmative, one arrives at another comparison block 54 which verifies whether a code proceeding from the receiving transducer 9 is present at the inlet 14 of the microcomputer 15. If the response is in the negative, one returns to the starting point; if the response is in the affirmative, one arrives at a block 55 which effects the syntactical control of the code received; with transmittal of the result to another block 56, which verifies whether the result of said control is affirmative or not. If the result is negative, one returns again to the starting point of the cycle, whereas, if the result is affirmative, one arrives at yet another block 55, which verifies whether the code present at the inlet 14 is the universal code or not; if the response is in the affirmative, one returns to the starting point of the cycle, since it is not to be anticipated that the mobilization for memorization of a new code can be accomplished by transmitting the universal code beforehand. In other words, this makes it impossible for the receiver 4 to be programmed by a person who know the universal code.

In the event that the code is not the universal code, one arrives at a block 58 which activates the memory 17 by sending appropriate signals to outlets 19 and 20 of the microcomputer 15, in accordance with what has been described above in reference to FIG. 2.

From block 58, on proceeds to the block 59, which latter verifies whether, in the memory 17, the number of codes stored therein is less than the number of pre-established codes which are subject to valuation.

If the response is in the negative (memory completely saturated with codes and thus not capable of being programmed with new codes), one returns to the start of the cycle; if the response is in the affirmative, one arrives instead at a comparison block 60 which verifies whether, in the memory 17, codes programmed by the user are stored. If the response is in the negative, this signifies that only the universal code is present, with the result that one then arrives at a block 61 which effects the recording of the new code in the memory 17, invalidates the universal code, for example, by erasing it, and sends to outlet 29 of the microcomputer 15 a signal which brings about the continuous illumination of the light-emitting diode in order to signal to the user that the receiver is now in the phase of recording and consecutively memorizing the new code. One then arrives at a block 62, which extinguishes the light-emitting code 30 when the programming has been effected, to proceed finally to a block 63 which verifies whether or not the key 28 is still being pressed. If the response is in the affirmative, one returns to the inlet of block 63, whereas, if the response is in the negative (key released), one arrives at a block 64 which signifies return to the main operating cycle.

In the event that comparison block 60 were to find in the memory 17 codes which have already been programmed by the user, one arrives at a following comparison block 65, in which the verification of the shared identity between the code received and one of the codes present in the memory 17 is effected. If the response is in the negative, one arrives at a block 66 relating to the main operating cycle, whereas, if the response is in the affirmative, one arrives at a block 67 which brings about the illumination of the light-emitting diode 30, all of which signals meaningfully to the user that the receiver 4 is ready to accept a new code and to store it in the memory 17. One then proceeds to a comparison block 68, which verifies whether this code is present at the inlet 14 of the microcomputer 15. If the response is in the negative, one returns to the inlet of block 68 in such a way as to await the occurrence of the presence of the new code; if the response is in the affirmative, one arrives instead at a block 69 which causes the newly arrived code to be recorded in the memory 17, by passing on to block 62, which signals to the user, by extinguishment of the light-emitting diode 30, that the new code has been committed to memory.

If the user has misguided his own emitter, it has been indicated in summary form above that it is likewise possible to program the receiver 4 by following an appropriate procedure and to do so at predetermined instants which are signaled to the user by the illumination of the light-emitting diode 30. In order to activate the procedure set forth above, it is necessary to press the key 28 intermittently, for example, three times in three seconds. By acting in this manner, one arrives from block 53 to a comparison block 71, which verifies whether the pressing of the key 28 has been effected the prescribed number of times during the pre-established period of time. If the response is in the negative, one arrives at a block 72 which forms part of the main operating cycle of the receiver 4; and, if the response is in the affirmative, one arrives at a block 73, which brings about the transmittal, to outlet 29 of the computer 16, of a signal that is adapted to the task of determining the alternate illumination and extinguishment of the light-emitting diode 30 during a predetermined period of time, (for example, one second of illumination, followed by one second of extinguishment). One next arrives at a block 74, which commits to memory those pressures which are exerted by the user on the key 28 and which occurred during those phases when the light-emitting diode 30 was, for example, illumined. Just as has already been stated, the number of illuminations of the diode 30 is equal to the number of bits that constitute one of the codes stored in the memory 17. At the end of this phase, during which the user must transmit the code to the receiver manually, by reading this code on a paper medium on which the code was reported, one arrives at a code 75 which verifies whether the code received is the same as one of those which are present in the memory 17. If the response is in the negative, one returns to the starting point; and, if the response is in the affirmative, one arrives at a block 76 which brings about the intermittent and, for example, rapid illumination of the light-emitting diode 30, in order to signal to the user that the recognition of the transmitted code has been effected. In these conditions, the user must not do anything other than press the key 28, and this is recognized by block 77 which verifies exactly whether or not the key 28 is pressed. If the response is in the negative, one remains in a waiting phase; whereas, if the response is in the affirmative, one arrives at the aforesaid block 67 which determines the illumination of the light-emitting diode 30 in continuous fashion, by signalling to the user that the receiver 4 is ready to accept the programming of a new code.

Thus, for initialization—and in the case of the known processes for (re)initialization—the receiver is driven, for example by means of a special control code, into a state in which it is ready for (re)fixing of the code or of the code set, generally by it storing the then-received signals directly or recoded in a ROM of the receiver.

The receiver should indicate as far as possible to the (re)initializing person that the receiver state necessary for (re)initialization is obtained. The invention requires particularly little outlay for this purpose. In the case of the invention, the receiver namely activates an indicator available in the motor vehicle in any case for other reasons to indicate that it is in the desired state, in a way which can be recognized by the person as typical for the desired (re)initialization state. The receiver thus indicates by means of means available in any case that the receiver has a corresponding (re)initialization state.

Particularly little additional outlay is required for this indication if, at the beginning of (re)initializing, the indication is represented by a visible and/or audible actuation of the central locking installation available in any case, that is for example by the moving of the door opening-and-closing pushbuttons, fitted in the doors, which are generally also indirectly actuated in any case by the receiver later when actuation of the central locking installation is proceeding.

Just as little outlay is required for the indication by the receiver that the (re)initialization has succeeded, if the receiver visibly and/or audibly actuates the central locking installation after successful (re)initialization, that is for example then (as well) actuates the pushbuttons fitted in the doors, normally opening and closing the doors.

The invention allows furthermore the (re)initialization to be initiated with particularly little outlay. For this purpose, the receiver can namely be driven into the state of (re)initializing for example even by means of a normally unusual actuation of the ignition key, namely for example by means of rapid switching on and off of the ignition ten times; then all that is required is a counter, usually available in any case in the receiver, which checks the number of ignition key actuations, for example before starting the engine. The receiver may also be driven into its state in which it is ready for (re)initialization also by other normally unusual activities with the ignition key: For example, for this purpose the ignition key may be turned (once or more than once successively in a particular rhythm) into a special position, possible only during parking, after which the receiver is ready for (re)initializing, for example during a particular following period of time.

Although the present invention has been described with reference to a specific embodiment, those of skill in the art will recognize that changes may be made thereto without departing from the scope and spirit of the invention as set forth in the appended claims.

I claim:

1. A process for operating a remote-controllable central locking installation of a vehicle by means of a transmitter, which can transmit coded signals to a receiver fitted in or on the vehicle, an initialization being carried out before the actuation for the first time of the central locking installation, or a reinitialization being carried out to cancel the previous code, or in the case of a changing code the relevant code set which can be used in future, and to establish a new code or code set, by the receiver being set into a mode in which it can be (re)initialized, comprising the improvement that:

the receiver is set into a reprogram mode in which it can be reinitialized by electronic means for initializing within the receiver, said electronic means adapted to be triggered by actuation of a vehicle switch; and the receiver indicates at the end of a successful (re)initialization by means of a perceptible actuation of the central locking installation of the vehicle that the receiver has been (re)initialized.

2. The process as claimed in patent claim 1, wherein the receiver indicates that it has successfully been driven into the state in which it can be (re)initialized by causing a perceptible actuation of the central locking installation.

3. The process as claimed in patent claim 1, wherein the actuation of the central locking installation is a moving of the door opening-and-closing pushbuttons fitted in the doors.

4. A process for operating a remote-controllable central locking installation of a vehicle by means of a transmitter, which can transmit coded signals to a receiver fitted in or on the vehicle, the vehicle having an ignition switch operated by an ignition key an initialization being carried out before the actuation for the first time of the central locking installation, or a reinitialization being carried out to cancel the previous code, or in the case of a changing code the relevant code set which can be used in the future, and to establish a new code or code set, by the receiver being set in a reprogram mode in which it can be (re)initialized, comprising the improvement that:

the receiver is driven by means of an actuation of the ignition key.

5. The process as claimed in patent claim 4, wherein the actuation of the ignition key is the switching of the ignition key into an ignition switch position usual only during parking, according to a preselected rhythm.

6. The process as claimed in patent claim 2, wherein the actuation of the central locking installation can be detected by the moving of the door opening-and-closing push buttons fitted in the doors.

7. The process as claimed in patent claim 4, wherein the actuation of the ignition key is a rapid switching on-and-off of the ignition a select number of times.

8. A method of initializing a remote controllable central locking installation for a vehicle having a remote transmitter and a receiver fixed to the vehicle and operatively connected to locks for doors of the vehicle, the receiver having electronic means for receiving and recording new instructions for recognizing future valid transmitter codes from a transmitter assigned to the vehicle when the electronic means is actuated to an initializing state, comprising the steps of: providing that said electronic means is in electronic communication with an electric switch which serves an additional function on the vehicle; providing that actuation of said electric switch triggers the electronic means into the initializing state; and actuating said switch to instigate the initializing state.

9. The method according to claim 8, wherein said electric switch is an ignition switch of the vehicle.

10. The method according to claim 9, wherein said step of actuating said switch is further defined as a repetitive actuating of said switch a preselected number of times and said electronic means is programmed to be triggered only after the switch communicates said preselected number of actuations thereto.

11. The method according to claim 9 comprising the further step of:

after said electronic means has reached an initializing state, providing that said receiver activates said locks as an indication thereof.

12. The method according to claim 11 comprising the further steps of:

after said indication has occurred, using said transmitter to send an initializing signal to said receiver; and after said receiver successfully receives said signal, said receiver activates said locks as an indication thereof.

13. The method according to claim 9 comprising the further step of:

after said electronic means has reached an initializing state, providing that said receiver activates a display means present on the vehicle.

* * * * *